US011353337B2

United States Patent
Takai

(10) Patent No.: US 11,353,337 B2
(45) Date of Patent: Jun. 7, 2022

(54) OFFSET CANCEL SYSTEMS AND METHODS FOR RESOLVER-TYPE SENSORS

(71) Applicant: SEMICONDUCTOR COMPONENTS INDUSTRIES, LLC, Phoenix, AZ (US)

(72) Inventor: Kazumasa Takai, Kakamigahara (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/177,346

(22) Filed: Feb. 17, 2021

(65) Prior Publication Data

US 2022/0136866 A1 May 5, 2022

Related U.S. Application Data

(60) Provisional application No. 63/109,181, filed on Nov. 3, 2020.

(51) Int. Cl.
*G01D 5/16* (2006.01)

(52) U.S. Cl.
CPC ..................... *G01D 5/16* (2013.01)

(58) Field of Classification Search
CPC ............ G01D 5/12–2525; G01D 3/036; H02P 6/16–188
See application file for complete search history.

(56) References Cited

U.S. PATENT DOCUMENTS

| 6,188,341 | B1* | 2/2001 | Taniguchi | G01D 5/24409 341/116 |
| 6,496,784 | B1* | 12/2002 | Dukart | G01D 1/16 702/94 |
| 7,203,618 | B2* | 4/2007 | Hammerschmidt | G01D 5/2448 702/151 |
| 2002/0148304 | A1 | 10/2002 | Goto et al. | |
| 2003/0102862 | A1 | 6/2003 | Goto et al. | |
| 2003/0196496 | A1 | 10/2003 | Goto et al. | |
| 2004/0066205 | A1 | 4/2004 | Liai et al. | |
| 2006/0082335 | A1 | 4/2006 | Lmai et al. | |
| 2006/0132338 | A1 | 6/2006 | Katakura et al. | |
| 2007/0007950 | A1 | 1/2007 | Goto et al. | |
| 2007/0029955 | A1 | 2/2007 | Kanekawa et al. | |

(Continued)

*Primary Examiner* — Huy Q Phan
*Assistant Examiner* — David B Frederiksen
(74) *Attorney, Agent, or Firm* — Adam R. Stephenson, Ltd.

(57) ABSTRACT

Implementations of a resolver sensor system may include a signal amplifier portion configured to be coupled to a magnetoresistive sensor coupled with a movable element where the signal amplifier portion configured to receive a sine signal and a cosine signal from the magnetoresistive sensor; and a sensor offset canceling portion coupled with a signal amplifier portion. The sensor offset canceling portion may be configured to generate a direct current offset correction signal to the signal amplifier portion which uses two or more amplifiers included in the signal amplifier portion to receive the sine signal and the cosine signal and to generate corresponding adjusted digital sine and cosine signals. The signal amplifier portion may be configured to provide the adjusted digital sine signal and the adjusted digital cosine signal to one of the servo signal processor or the system controller for use in determining a position of the movable element.

20 Claims, 16 Drawing Sheets

(56) References Cited

U.S. PATENT DOCUMENTS

| | | |
|---|---|---|
| 2007/0050139 A1 | 3/2007 | Sidman |
| 2009/0179792 A1 | 7/2009 | Remondi |
| 2009/0179793 A1 | 7/2009 | Remondi |
| 2009/0267593 A1 | 10/2009 | Goto et al. |
| 2009/0319245 A1 | 12/2009 | Ivchenko et al. |
| 2010/0079101 A1 | 4/2010 | Sidman |
| 2010/0214166 A1 | 8/2010 | Remondi et al. |
| 2010/0321006 A1 | 12/2010 | Suzuki |
| 2011/0227556 A1 | 9/2011 | Ivchenko et al. |
| 2012/0217912 A1* | 8/2012 | Wu .................. H02P 6/20 318/400.04 |
| 2013/0249452 A1 | 9/2013 | Shinohara |
| 2014/0114631 A1 | 4/2014 | Ivchenko et al. |
| 2014/0117980 A1 | 5/2014 | Ely |
| 2014/0125267 A1 | 5/2014 | Suzuki |
| 2014/0167529 A1 | 6/2014 | Teising et al. |
| 2014/0361720 A1 | 12/2014 | Miyachi et al. |
| 2015/0019152 A1* | 1/2015 | Scheibenzuber .... G01D 5/2448 702/94 |
| 2015/0318705 A1 | 11/2015 | Lucas et al. |
| 2016/0146632 A1 | 5/2016 | Mol |
| 2017/0268865 A1 | 9/2017 | Kimata et al. |
| 2018/0052013 A1 | 2/2018 | Chellamuthu et al. |
| 2018/0115261 A1* | 4/2018 | Staebler .............. G01D 18/002 |
| 2018/0164132 A1 | 6/2018 | Lechner et al. |
| 2019/0025052 A1 | 1/2019 | Nee et al. |
| 2019/0052083 A1 | 2/2019 | Lucas, Jr. et al. |
| 2020/0041310 A1 | 2/2020 | Lassalle-Balier et al. |
| 2020/0041583 A1 | 2/2020 | Cadugan et al. |
| 2020/0116532 A1* | 4/2020 | Janisch ................ G01D 3/036 |
| 2020/0264016 A1* | 8/2020 | Janisch ................ G01D 3/036 |

* cited by examiner

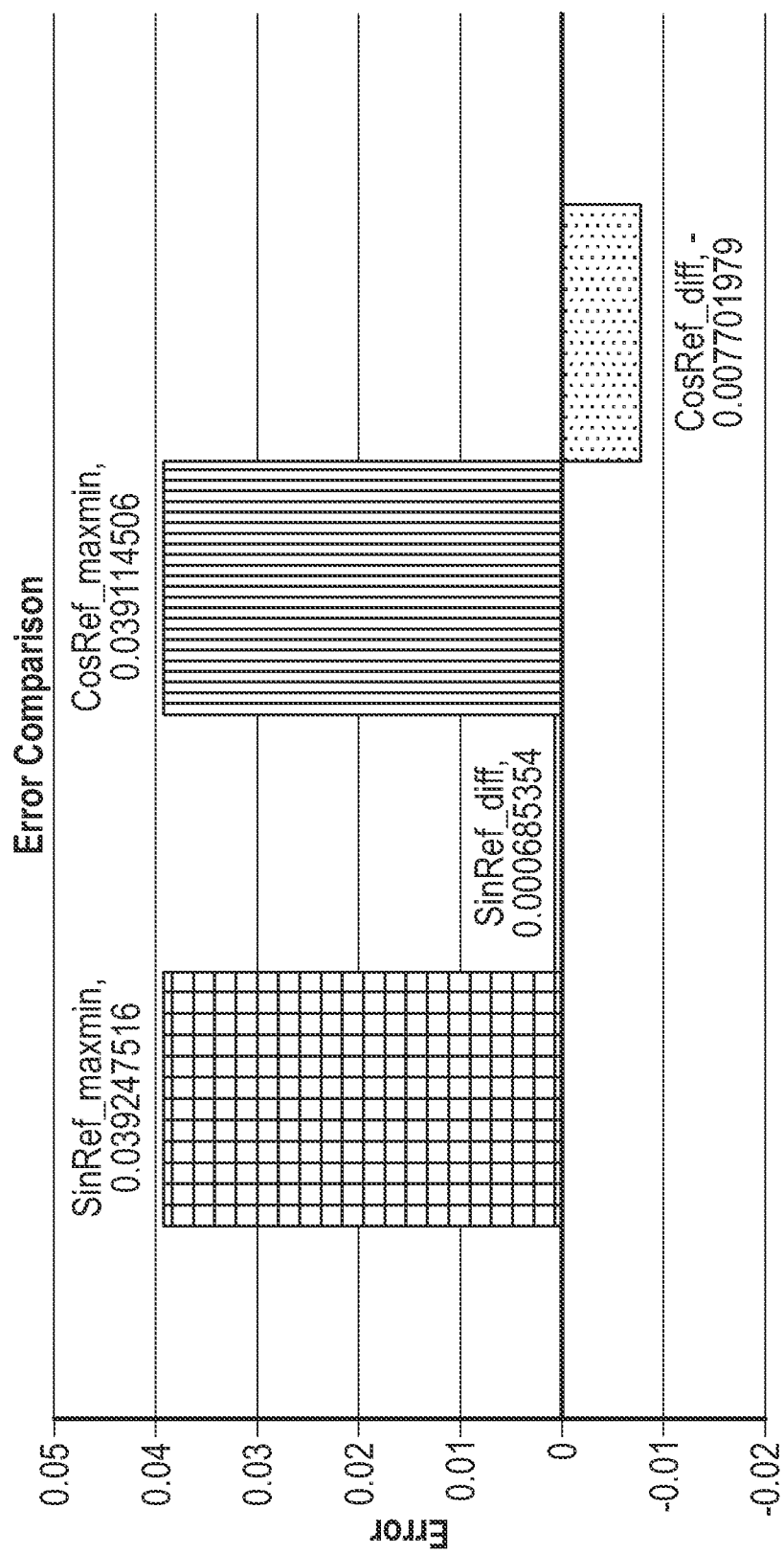

OFFSET CANCEL SYSTEMS AND METHODS FOR RESOLVER-TYPE SENSORS

CROSS REFERENCE TO RELATED APPLICATIONS

This document claims the benefit of the filing date of U.S. Provisional Patent Application 63/109,181, entitled "Offset Cancel Method For a Resolver Type Sensor" to Kazumasa Takai, which was filed on Nov. 3, 2020, the disclosure of which is hereby incorporated entirely herein by reference.

BACKGROUND

1. Technical Field

Aspects of this document relate generally to control systems. More specific implementations involve control systems involving sensor devices and related sensor error correction systems.

2. Background

Control systems are utilized to enable automatic or semi-automatic control of a particular device or system. For example, a control system for a lighting device may sense the current currently being drawn by a light bulb, receive a manual input, from a user, and adjust the current supplied to the light bulb in response thereby dimming or increasing the intensity of the light emitted by the bulb.

SUMMARY

Implementations of a resolver sensor system may include a signal amplifier portion configured to be coupled to a magnetoresistive sensor, the magnetoresistive sensor configured to be coupled with a movable element, the signal amplifier portion configured to receive a sine signal and a cosine signal from the magnetoresistive sensor; and a sensor offset canceling portion coupled with a signal amplifier portion and configured to be coupled with a system controller where the signal amplifier portion may be configured to couple with a servo signal processor coupled with an actuator driver. The sensor offset canceling portion may be configured to generate a direct current offset correction signal to the signal amplifier portion. The signal amplifier portion may be configured to use two or more amplifiers included in the signal amplifier portion to receive the sine signal and the cosine signal and to generate a corresponding adjusted digital sine signal and a corresponding adjusted digital cosine signal. The signal amplifier portion may be configured to provide the adjusted digital sine signal and the adjusted digital cosine signal to one of the servo signal processor or the system controller for use in determining a position of the movable element.

Implementations of resolver sensor systems may include one, all, or any of the following:

The adjusted digital sine signal and the adjusted digital cosine signal were adjusted to remove a direct current offset present in the sine signal and a direct current offset present in the cosine signal, respectively.

The signal amplifier portion and the sensor offset canceling portion may be configured to remove a direct current offset present in the sine signal and a direct current offset present in the cosine signal that includes one of asymmetry, amplitude fluctuation, or both asymmetry and amplitude fluctuation.

The signal amplifier portion further may include a digital to analog converter coupled to a first one of the two or more amplifiers and an analog to digital converter coupled to a second one of the two or more amplifiers.

The sensor offset canceling portion further may include: a first noise reduction filter coupled to a first zero cross detector coupled with a first two AND gates, a first two multiplexers, a first two latches, and a first averaging module; and a second noise reduction filter coupled to a second zero cross detector coupled with a second two AND gates, a second two multiplexers, a second two latches, and a second averaging module.

The first averaging module may be configured to calculate a direct current offset for the sine signal and the second averaging module may be configured to calculate a direct current offset for the cosine signal.

Implementations of a sensor offset canceler for a resolver sensor system may include a first noise reduction filter configured to receive a digital sine signal from a signal amplifier portion and generate a filtered digital sine signal; a first zero cross detector configured to receive the filtered digital sine signal and output a rising zero cross point signal and a falling zero cross point signal; and a first two AND gates coupled with the first zero cross detector. The system may include a first multiplexer and a first latch coupled with a first one of the first two AND gates; a second multiplexer and a second latch coupled with a second one of the first two AND gates; a first averaging module coupled with the first latch and with the second latch where the first averaging module is configured to output a direct current offset correction for a cosine signal. The system may include a second noise reduction filter configured to receive a digital cosine signal from a signal amplifier portion and generate a filtered digital cosine signal; a second zero cross detector configured to receive the filtered digital cosine signal and output a rising zero cross point signal and a falling zero cross point signal; and a second two AND gates coupled with the second zero cross detector. The system may include a third multiplexer and a third latch coupled with a first one of the second two AND gates; a fourth multiplexer and a fourth latch coupled with a second one of the second two AND gates; and a second averaging module coupled with the third latch and with the fourth latch where the second averaging module is configured to output a direct current offset correction for a sine signal.

Implementations of a sensor offset canceler may include one, all, or any of the following:

The first one of the first two AND gates may be configured to receive a sine rising zero cross detection flag.

The second one of the first two AND gates may be configured to receive a sine falling zero cross detection flag.

The first one of the second two AND gates may be configured to receive a cosine rising zero cross detector flag.

The second one of the second two AND gates may be configured to receive a cosine falling zero cross detector flag.

The first zero cross detector may be configured to take a derivative of the filtered digital sine signal.

The second zero cross detector may be configured to take a derivative of the filtered digital cosine signal.

Implementations of a method of correcting direct current offset error for a resolver sensor system may include receiving a sine signal and a cosine signal from a resolver sensor at a signal amplifier portion; amplifying the sine signal using a first one or more amplifiers; amplifying the cosine signal using a second one or more amplifiers; converting the sine signal to a digital sine signal using a first analog to digital converter; and converting the cosine signal to a digital cosine signal using a second analog to digital converter. The method may include, using a sensor offset canceling portion: taking a derivative of the sine signal; using a first zero cross detector, generating a sine rising zero cross signal and a sine falling zero cross signal using the derivative of the sine signal; and with a sine rising zero cross detection flag and a first AND gate, setting a state of a first sine rising latch. The method may include with a sine falling zero cross detection flag and a second AND gate, setting a state of a second sine falling latch; and taking a derivative of the cosine signal. The method may include, using a second zero cross detector, generating a cosine rising zero cross signal and a cosine falling zero cross signal using the derivative of the cosine signal; and with a cosine rising zero cross detection flag and a third AND gate, setting a state of a third cosine rising latch. The method ma include with a cosine falling zero cross detection flag and a fourth AND gate, setting a state of a fourth cosine falling latch; averaging outputs of the first sine rising latch and the second sine falling latch using a first averaging module and outputting an analog direct current cosine offset signal; and averaging outputs of the third cosine rising latch and the fourth cosine falling latch using a second averaging module and outputting an analog direct current sine offset signal.

Implementations of a method of correcting direct current offset error for a resolver sensor system may include one, all, or any of the following:

The method may include generating a digital direct current cosine offset correction signal using a second digital to analog converter; providing the digital direct current cosine offset correction signal to the second one or more amplifiers of the signal amplifier portion; generating a digital direct current sine offset correction signal using a first digital to analog converter; and providing the digital direct current sine offset correction signal to the first one or more amplifiers of the signal amplifier portion.

The method may include using the digital direct current offset correction cosine signal as an input to the first one or more amplifiers, adjusting an output of the one or more amplifiers; and using the digital direct current sine offset correction signal as an input to the second one or more amplifiers, adjusting and output of the second one or more implementations.

Implementations of a method of calculating a direct current offset correction value using the resolver sensor system like any disclosed herein may include: using the actuator driver, sending a signal to an actuator coupled with the movable element configured to drive the movable element to a mechanical end position; using the signal amplifier portion in the sensor offset canceling portion, performing zero cross detection; and using the sensor offset canceling portion, calculating a direct current offset correction for the sine signal and a direct current offset correction for the cosine signal.

Method implementations may include using the signal amplifier portion, canceling a direct current offset present in the sine signal using the direct current offset correction for the sine signal; and using the signal amplifier portion, canceling a direct current offset present in the cosine signal using the direct current offset correction for the cosine signal.

Method implementations may include where driving the movable element to the mechanical end position further may include comparing a derivative of one of a filtered sine signal or a filtered cosine signal with a predetermined threshold value.

Performing zero cross detection further may include waiting an initial mask time period prior to initiating a sampling period.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 16 is a diagram of the remaining direct current error in the sine wave and in the cosine wave of FIG. 15 when corrected using the method illustrated in FIG. 2 compared to correcting using an implementation of correcting direct current error disclosed herein.

DESCRIPTION

This disclosure, its aspects and implementations, are not limited to the specific components, assembly procedures or method elements disclosed herein. Many additional components, assembly procedures and/or method elements known in the art consistent with the intended offset cancel systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such offset cancel systems and related methods and implementing components and methods, consistent with the intended operation and methods.

Figure 1:
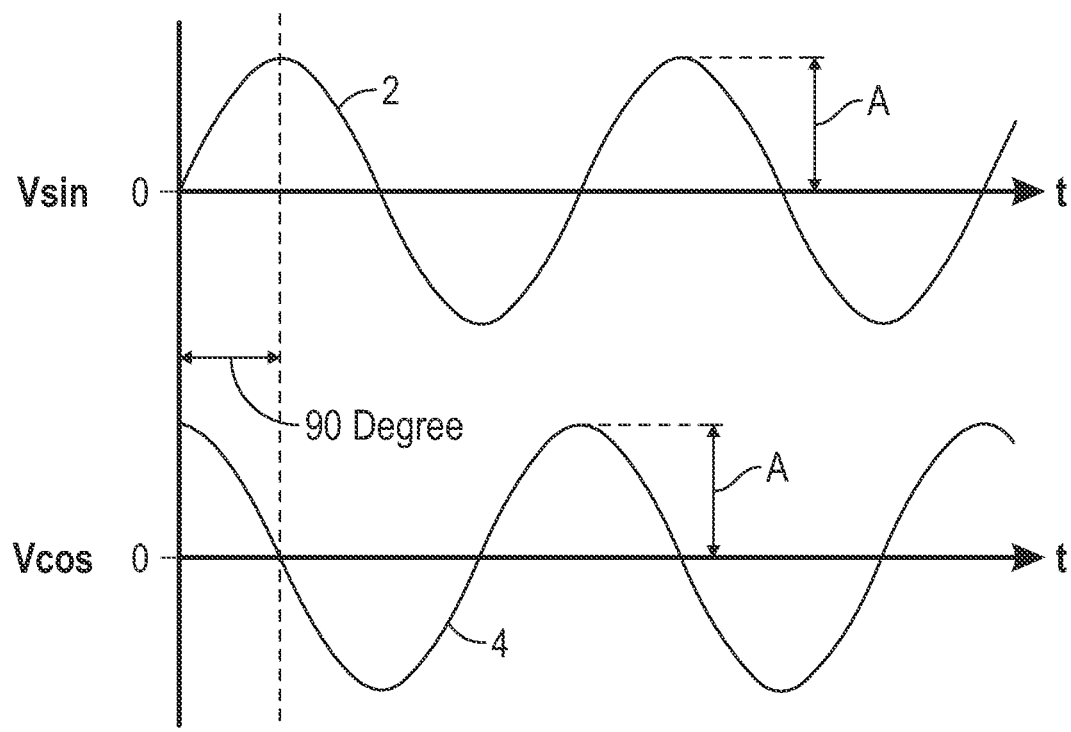
FIG. 1 is a graph of an implementation of a sine wave and a cosine wave.

In various implementations of applications involving rotary machines and linear motion machines, a resolver-type sensor is utilized to track the position of various components of the system. As used herein, a resolver-type/resolver sensor means a sensor that has two sinusoidal signal outputs with phase difference of 90 degrees or about 90 degrees relative to each other capable of detecting a position of a moving element. In FIG. 1 illustrates two such signals, V sin 2 and V cos 4 which correspond to a time-varying sine wave signal and a time-varying cosine wave signal, respectively. As illustrated, V sin 2 is 90 degrees offset, phase offset, or for phase shifted relative to the V cos 4. Each of V sin 2 and V cos 2 has an amplitude represented by A. The use of resolver sensors may be particularly useful in a linear motion machine that involves sensing travel over a long working distance. In various applications, sensor resolution and accuracy requirements are becoming more stringent.

Figure 2:
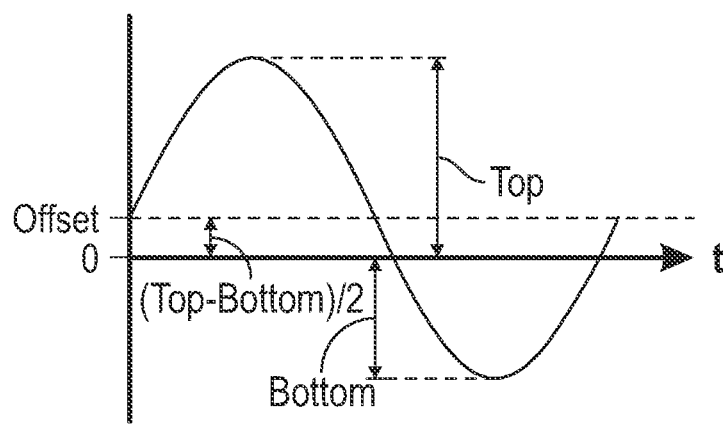
FIG. 2 is a graph of a first implementation of a direct current offset correction method.

A principal source of detection error for a resolver sensor is the direct current (DC) offset. Handling direct current offset is generally challenging using only sensor design characteristics. Various types of DC offset may be present in either the sine signal, the cosine signal, or both signals, including, by non-limiting example, amplitude fluctuation, asymmetry, both amplitude fluctuation and asymmetry, noise, or other deviation from an idea sine or cosine waveform. Accordingly, various methods that allow for correction of existing direct current offset in resolver sensor have been devised. Referring to FIG. 2, a graphic illustrating an implementation of a method of correcting a direct current offset in a sinusoidal signal is illustrated. In this method, the direct current offset value is determined by comparing the difference between the top amplitude in the bottom amplitude of the sine or cosine wave being provided by the sensor. The difference between the two forms the offset as described in FIG. 2. A challenge present by this method is that when an amplitude of the sinusoidal signal is fluctuating over time, a calculated direct current offset for the resolver sensor may be increasingly erroneous over time.

Various implementations of offset cancel systems and related methods disclosed in this document may be utilized with a wide variety of resolver sensor implementations including, by non-limiting example, giant magnetoresistance sensors, tunnel magnetoresistance sensors or any other sensor that relies on a resolver signal. Those of ordinary skill in the art will be able to develop many system and method implementations using the principles disclosed in this document.

Referring to FIG. 1, the following equations outlined the basic resolver signal that is formed of two sinusoidal waves which have a phase difference of 90 degrees relative to each other. The wave that passes through the origin is defined as the sine function and the wave that has maximum amplitude at the origin is defined as the cosine function.

$V \cos = A \cos \omega t$ $V \sin = A \sin \omega t$

Resolver signals with direct current offset Vsao and Vcao and can be defined as shown in the equations below. Vso and Vco are the DC offset for the sine signal, and the cosine signal, respectively. Sources of Vso and Vco may be generated by production variations in various resolver sensors and production variations in the construction of the components of amplifiers for the sensor signal.

$Vsao = V\sin + Vso = A \sin \omega t + Vso$ $Vcao = V\cos + Vco = A \cos \omega t + Vco$ In various method implementations, the signal from the resolver sensor that includes the direct current offset that needs to be offset/corrected for can be represented by two functions:

$Vsao = A \sin \omega t + Dsoff$ $Vcao = A \cos \omega t + Dcoff.$ where Vsao is the voltage sine analog offset and Vcao is the voltage cosine analog offset and Dsoff is the DC sine signal offset and Dcoff is the DC cosine offset.

The zero-cross point of the derivative function for the sine function indicates a zero cross timing point for the cosine function absent its DC offset (as mathematically, the derivative function lacks the original cosine function's non-time varying DC offset value). Similar, the zero cross timing point for derivative function for the cosine function indicates a zero cross timing point for the sine function absent its DC offset (again, mathematically, the derivative function lacks the original sine function's non-time varying DC offset value). In various method implementations, this property of the derivative functions/derivatives of the sine functions and the cosine functions disclosed herein is used to calculate timings and set flags used to identify and correct for the DC offset value in the sine function and in the cosine function from the resolver sensor.

Dds and Ddc are derivative of digitized form of Vsao and Vcao or the derivative of the digital sine function and the derivative of the digital cosine function from the resolver sensor. These may be represented mathematically as follows:

$$\frac{dVsao}{dt} = A\cos\omega t = Dds$$

$$\frac{dVcao}{dt} = -A\sin\omega t = Ddc$$

These derivative functions can be used in various method implementations to set/determine/store different zero cross timing flags identifying when the respective derivative function crosses the x-axis (zero crosses) when rising or falling. In a particular method implementation, these zero cross timing flags may be represented as follows: CRZC=derivative digital cosine rising zero cross timing flag; CFZC=derivative digital cosine falling zero cross timing flag; SRZC=derivative digital sine rising zero cross timing flag; and SFZC=derivative digital sine falling zero cross timing flag. The values/expressions of the digital cosine function and the digital sine function at each of these zero cross timing flags can be used to find corresponding values for the original voltage sine analog offset function and the original voltage cosine analog offset function. In a particular implementation, this is done by calculating values of the Vsao and Vcao functions at the points where the zero cross timing flags are set equal to zero. In this way, the digital sine zero cross falling (Dszf) is the Vsao value at CRZC=1, the digital sine zero cross rising (Dszr) is the Vcao value at CFZC=1, the digital cosine zero cross falling value is the Vsao value at SFZC=1, and the digital cosine zero cross rising value is the Vcao value at SRZC=1.

The DC offset values for the sine signal and for the cosine signal from the resolver sensor are the respective sums of the function values at the zero cross points. Once these DC offset values have been calculated, they can then be applied to the original Vsao and Vcao to cancel/remove the DC offset from each signal and thereby ensure the data from the resolver sensor no longer includes that DC offset value/DC offset bias value. The following expressions show the calculation in a particular method implementation:

$$Dsoff = \frac{\sum_{i=0}^{a} Dszf[n+i] + Dszr[n+i]}{2(a+1)}$$

$$Dcoff = \frac{\sum_{j=0}^{b} Dczf[n+j] + Dczr[n+j]}{2(b+1)}$$

where n is the nth timing value and a and b are either 0 or a positive odd number.

Figure 3:
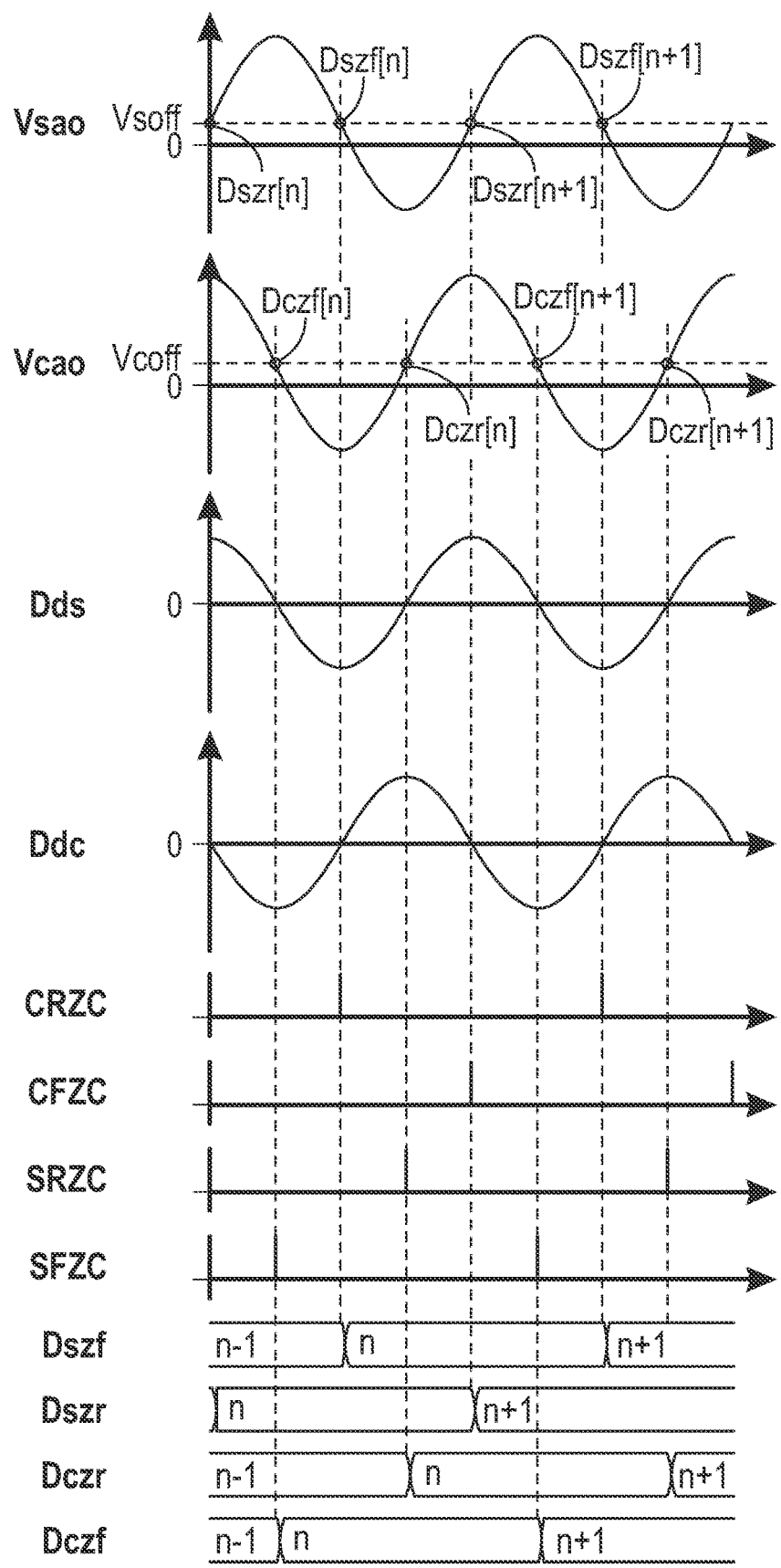
FIG. 3 is a graph of various signals used in an implementation of calculating a direct current offset correction value for a sine wave and a cosine wave generated by a resolver sensor.

Referring to FIG. 3, a graph of various signals used in an implementation of calculating a direct current offset correction value for a sine wave and a cosine wave generated by a resolver sensor. In this graph, the various graphs are aligned in the time domain, and illustrate the time varying graphs of the sine signal Vsao, the cosine signal Vcao, the derivative of the sine signal Dds, the derivative of the cosine signal Ddc, the corresponding timing flags at each of the rising and falling zero crossing points CRZC, CFZC, SRZC, and SFZC and the various signal components that can be added up across the n components as Dszf, Dszr, Dczr, and Dczf to form the DC offset for the sine signal and the DC offset for the cosine signal. This DC offset for the sine signal and for the cosine signal can then be used to remove the DC offset in the original signals and ensure the resolver sensor is accurate.

Figure 4:
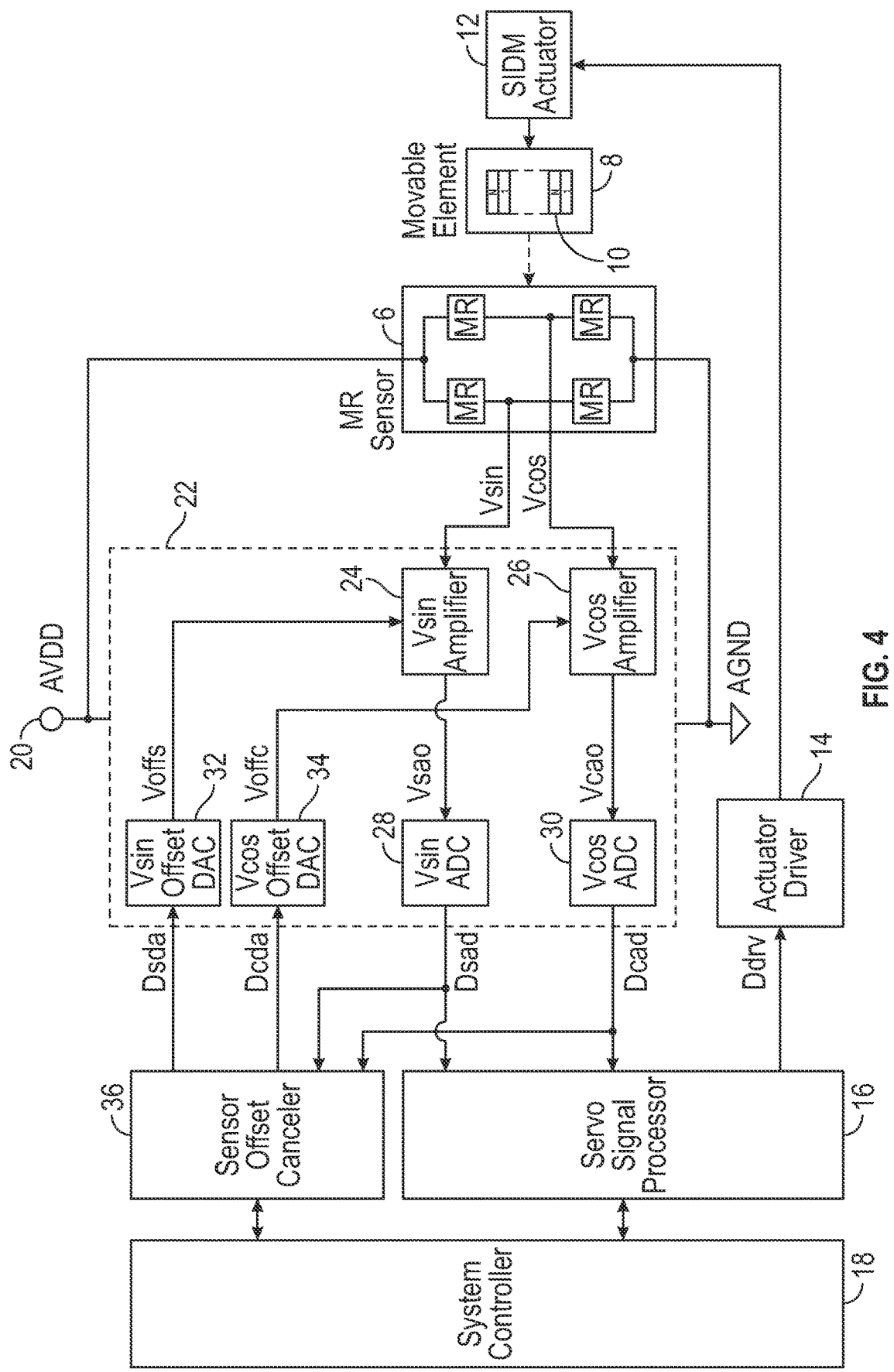
FIG. 4 is a block diagram view of a resolver sensor in combination with a movable element and a system controller.

Various resolver sensor offset cancellation/correction system implementations may utilize various implementations of the foregoing method to calculate and correct/remove DC current offset from the sine signal and the cosine signal coming from a resolver sensor. Referring to FIG. 4, a block diagram of a resolver sensor in combination with a movable element and a system controller is illustrated. In this implementation, the movable element is part of a servo system that includes a resolver-type magnetoresistive sensor 6 like any disclosed in this document. The magnetoresistive (MR) sensor 6 detects a position of the moveable element 8 that includes a magnet 10 that has a sinusoidally varying magnetic flux distribution. The movable element 8 in this implementation is driven/moved by a smooth impact drive mechanism (SIDM) linear piezoelectric actuator 12. While the use of an SIDM actuator 12 is illustrated in the implementation illustrated in FIG. 4, in various implementations, any of a wide variety of actuator types may be utilized, such as, by non-limiting example, pneumatic, hydraulic, electronic, geared, manual, or any other system capable of moving the movable element. The SIDM actuator 12 moves under the control of actuator driver 14 which acts in response to digital drive signal Ddrv from servo signal processor 16 (though the digital drive signal Ddrv may also be generated by system controller 18 in some implementations).

During operation, the MR sensor 6 generates sine signal V sin and cosine signal V cos which each have a sine sinusoidal voltage waveform and a cosine sinusoidal voltage waveform as the resolver signal. In this implementation, the voltage of each of V sin and V cos are each half of the supply voltage AVDD 20 supplied to the MR sensor 6. The supply voltage AVDD 20 is also supplied to an amplifier portion/signal amplifier portion 22 of the system indicated by the dotted line which includes two or more amplifiers. A first one 24 of the two or more amplifiers receives and amplifies the V sin signal to generate the voltage sine analog offset (Vsao) signal and a second one 26 of the two or more amplifiers receives and amplifies the V cos signal to generate the voltage cosine analog offset (Vcao) signal. The supply voltage AVDD 20 signal is also shared with analog to digital converters V sin ADC 28 and V cos ADC 30 and with digital to analog converters V sin Offset DAC 32 and V cos Offset DAC 34. In this way, any error caused by fluctuations in the voltage of the supply voltage AVDD can be canceled out/netted out during operation. V sin ADC 28 acts to take Vsao and converts it to corresponding digital sine signal Dsad while V cos ADC 30 acts to take Vcao and converts it to corresponding digital cosine signal Dcad. The digital sine signal Dsad and the digital cosine signal Dcad are then supplied to the servo signal processor 16 and to the sensor offset canceler/sensor offset cancelling portion 36 of the system for subsequent use in generating servo control signals and for preparation of a offset value for use in cancelling DC offset in the sine signal V sin and cosine signal V cos from the MR sensor 6, respectively. The system controller 18 may, in various implementations, also receive Dsad, Dcad, signals from servo signal processor 16, and/or signals from sensor offset canceler 36 to generate various control signals based on the signal types, signal values, signal flags, commands, and/or system events. The various system components except for the V sin amplifier 24, V cos amplifier 26, and the MR sensor 6 operate using period of operation Fs (servo operation period) which allows the digital circuit components involved in signal processing and driving the SIDM actuator 12 to operate using the same period of operation Fs. In various implementations, the period of operation Fs may be implemented using a clock/timing circuit included in the system controller 18, the servo signal processor 16 and/or the sensor offset canceler 36 (sensor offset canceling portion).

As will be discussed further in detail, the sensor offset canceler 36 works to generate digital value Dsda and digital value Dcda signals which are then processed by V sin Offset DAC 32 (second DAC) to generate sine DC voltage offset Voffs signal (digital direct current sine offset correction signal) and processed by V cos Offset DAC 34 (first DAC) to generate cosine DC voltage offset Voffc signal (digital direct current cosine offset correction signal). As illustrated, the Voffs value is supplied to V sin amplifier 24 (first one or more amplifiers) and the Voffc value is supplied to the V cos amplifier 26 (second one or more amplifiers) as a control value to each amplifier system to cancel/remove a DC offset present in the sine signal V sin and in the cosine V cos, respectively, being processed by the corresponding V sin amplifier 24 and V cos amplifier 26.

Figure 6:
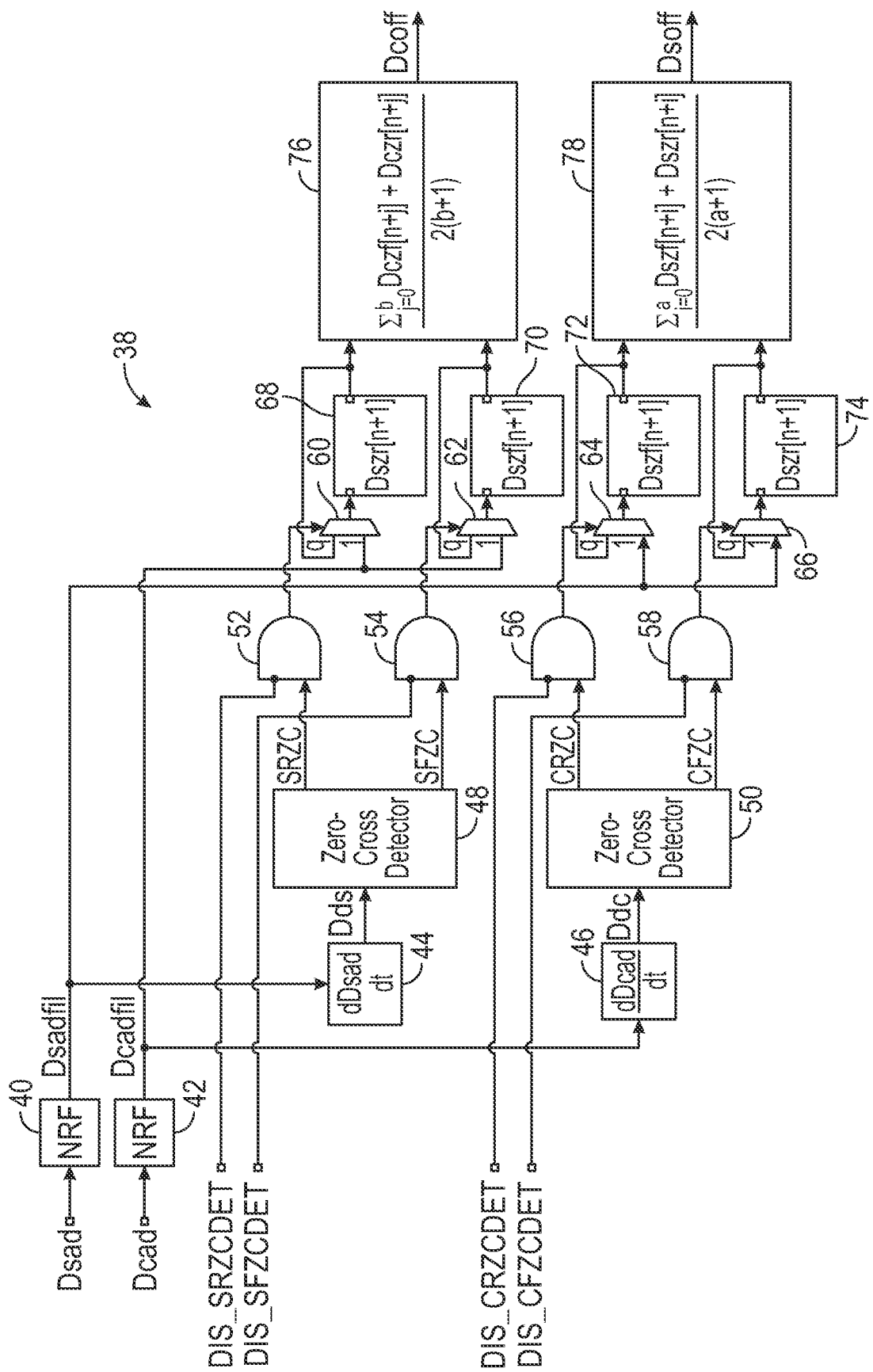
FIG. 6 is a block diagram view of an implementation of a sensor offset canceler.

The process of generating the Voffs and Voffc offset values (direct current offset correction signals) for use by the amplifier in cancelling the DC offset in the V sin and V cos signals to ultimately produce a corresponding adjusted digital sine signal and a corresponding adjusted digital cosine signal may be carried out by various system implementations of sensor offset cancelers/sensor offset canceling portions of the system. An example of a sensor offset canceler 38 is illustrated in FIG. 6 which includes various internal components along with various system flag inputs for logic processing of the input signals. As illustrated, the sensor offset canceler 38 includes a first noise reduction filter (NRF) 40, a second noise reduction filter (NRF) 42 which each respectively receive the digital sine signal Dsad and the digital cosine signal Dcad and produce a respective filtered digital sine signal Dsadfil (digital sine signal) and filtered digital cosine signal Dcadfil (digital cosine signal). The noise reduction filters may be low pass filters in various implementations with the same response character. In various implementations the Dsad and Dcad are the analog to digital converted value of the respective Vsao and Vcao signals that have been sampled at the Fs period previously discussed.

As illustrated in FIG. 6, the filtered Dsadfil and Dcadfil is then divided and a portion is sent to sine derivative module 44 and cosine derivative module 46, respectively, where the time derivatives of the filtered Dsadfil and Dcadfil signals are taken using various electronic components to form respective digital derivative sine signal Dds and digital derivative cosine signal Ddc, respectively. This process may be represented mathematically as follows:

$$\frac{dDsadfil}{dt} = Dds$$

$$\frac{dDcadfil}{dt} = Ddc$$

The time varying Dds and Ddc signals are then supplied to a first zero cross detector 48 and to a second zero cross detector 50 which are implemented using various electronic components. The first zero cross detector 48 then generates a sine rising zero cross detector signal/flag SRZC when the zero cross point of the Dds signal is detected on the rising side of the signal and a sine falling zero cross detector signal/flag SFZC when the zero cross point of Dds is detected on the falling side of the signal. The second zero cross detector 50 correspondingly generates a cosine rising zero cross detector signal/flag CRZC when the zero cross point of the Ddc signal is detected on the rising side of the signal a cosine falling zero cross detector signal/flag CFZC when the zero cross point of Ddc is detected on the falling side of the signal. Similar to the previously discussed derivation, the corresponding values of the Vsao and Vcao functions are calculated at each of the flags to determine a digital sine zero cross falling value (Dszf) as the Vsao value at CRZC=1, the digital sine zero cross rising value (Dszr) as the Vcao value at CFZC=1, the digital cosine zero cross fallings value as the Vsao value at SFZC=1, and the digital cosine zero cross rising value as the Vcao value at SRZC=1. Similarly, the DC offset values for the sine signal and the cosine signal can be calculated using the following:

$$Dsoff = \frac{\sum_{i=0}^{a} Dszf[n+i] + Dszr[n+i]}{2(a+1)}$$

$$Dcoff = \frac{\sum_{j=0}^{b} Dczf[n+j] + Dczr[n+j]}{2(b+1)}$$

where n is the nth timing value and a and b are either 0 or a positive odd number and Dszf[n]=Dsad values at timing which is indicated by falling zero-cross points of derivative of the Dcad.

Dszr[n]=Dsad values at timing which is indicated by rising zero-cross points of derivative of the Dcad.

Dczf[n]=Dcad values at timing which is indicated by falling zero-cross points of derivative of the Dsad.

Dczr[n]=Dcad values at timing which is indicated by rising zero-cross points of derivative of the Dsad.

Figure 5:
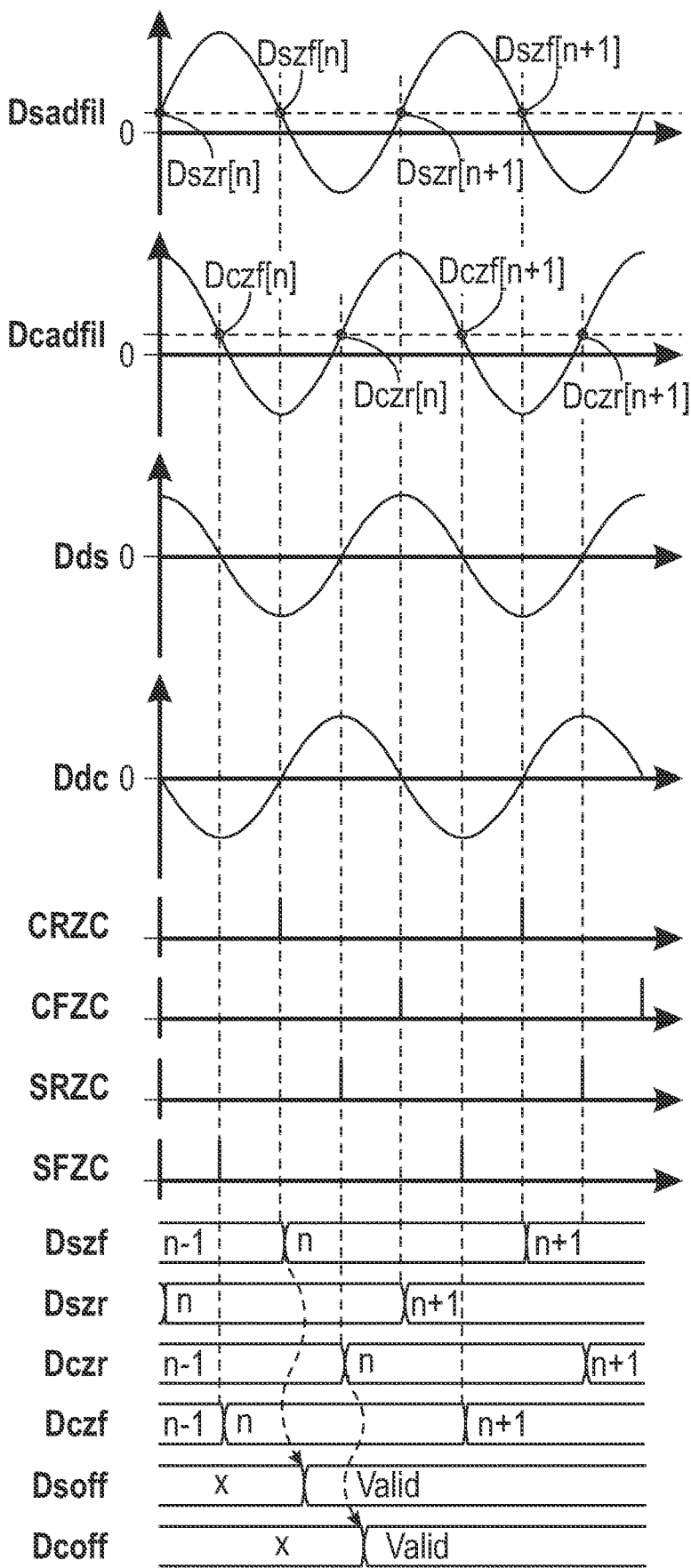
FIG. 5 is a graph of various signals used in another implementation of calculating a direct current offset correction value for a sine wave and a cosine wave generated by a resolver sensor.

FIG. 5 illustrates the various time aligned signals used in calculating a direct current offset correction value for a sine wave and a cosine wave generated by a resolver sensor using the previously discussed relationships in the case where a=b=1.

As illustrated in FIG. 6, a set of detection signals are generated and utilized in combination with first AND gate 52, second AND gate 54, third AND gate 56, and fourth AND gate 58 and the sine rising zero cross detection flag, the sine falling zero cross detection flag, the cosine rising zero cross detection flag, and the cosine falling zero cross detection flag, respectively, to provide the input control signals to first, second, third, and fourth multiplexers 60, 62, 64, 66. The detection flags DIS_SRZCDET, DIS_SFZCDET, DIS_CRZCDET and DIS_CFZCDET illustrated in FIG. 6 and other detection signals are set and processed by the zero cross detectors 48, 50 and the AND gates 52, 54, 56, 58 using various implementations of logic relationship involving the various flags. A particular implementation of such logic relationships used to set the detection flags DIS_SRZCDET, DIS_SFZCDET, DIS_CRZCDET and DIS_CFZCDET using the state transition/timing chart 81 implementation illustrated in FIG. 7. The state transition chart outlines the enabling and disabling of the system components used to detect each zero cross event and determine whether it is a rising or falling event. In various implementations, the detections flags are used to give a hysteresis character to the zero cross detection process. The state transition charge logic is executed in various implementations using the Fs period previously discussed. The logic employed by the zero cross detectors 48, 50 in a particular method implementation is illustrated by the following relationships that define SFZC, SRZC, CRZC and CFZC:

$$SRZC = \begin{cases} 1, & (dDSRZc = 1) \wedge (DIS\_SRZCDET = 0) \\ 0, & \text{Else} \end{cases}$$

$$SFCZ = \begin{cases} 1, & (dDSFZc = 1) \wedge (DIS\_SFZCDET = 0) \\ 0, & \text{Else} \end{cases}$$

$$CRZC = \begin{cases} 1, & (dDCRZc = 1) \wedge (DIS\_CRZCDET = 0) \\ 0, & \text{Else} \end{cases}$$

$$CFCZ = \begin{cases} 1, & (dDCFZc = 1) \wedge (DIS\_CFZCDET = 0) \\ 0, & \text{Else} \end{cases}$$

where dDSFZc, dDSRZc, dDCRZc and dDCFZc are defined as:

$$dDSRZc = \begin{cases} 1, & (Dds[n-1] < 0) \wedge (Dds[n] \geq 0) \\ 0, & \text{Else} \end{cases}$$

$$dDSFZc = \begin{cases} 1, & (Dds[n-1] > 0) \wedge (Dds[n] \leq 0) \\ 0, & \text{Else} \end{cases}$$

$$dDCRZc = \begin{cases} 1, & (Ddc[n-1] < 0) \wedge (Ddc[n] \geq 0) \\ 0, & \text{Else} \end{cases}$$

$$dDCFZc = \begin{cases} 1, & (Ddc[n-1] > 0) \wedge (Ddc[n] \leq 0) \\ 0, & \text{Else} \end{cases}$$

and where ZCHYSH and ZCHYSL are predetermined threshold values for the hysteresis parameter. In various implementations, the detection flags DIS_SRZCDET, DIS_SFZCDET, DIS_CRZCDET and DIS_CFZCDET may be initially set to 1 to avoid wrong sampling.

Figure 7:
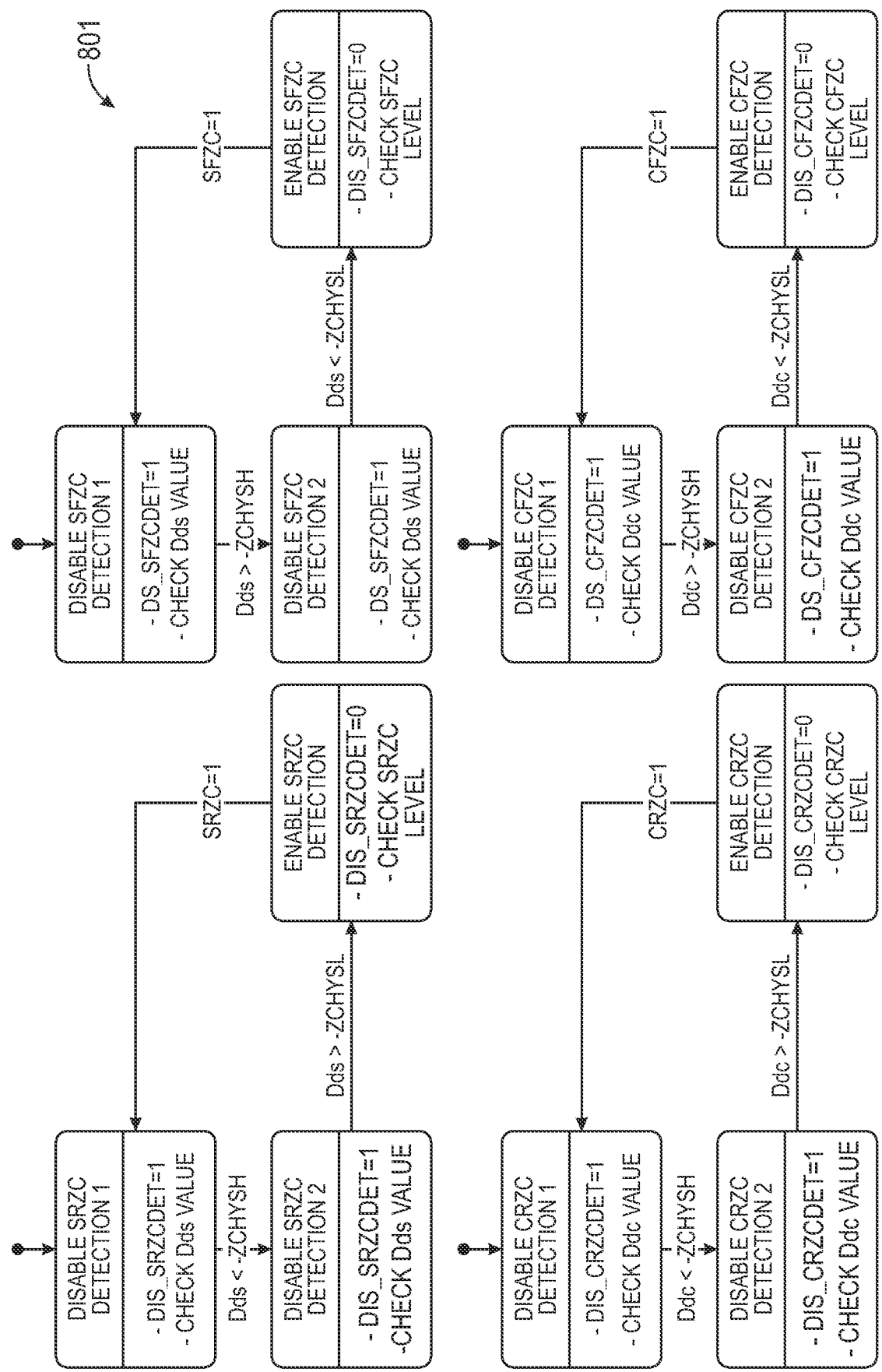
FIG. 7 is a state transition chart board implementation of a sensor offset correction system.
Figure 8:
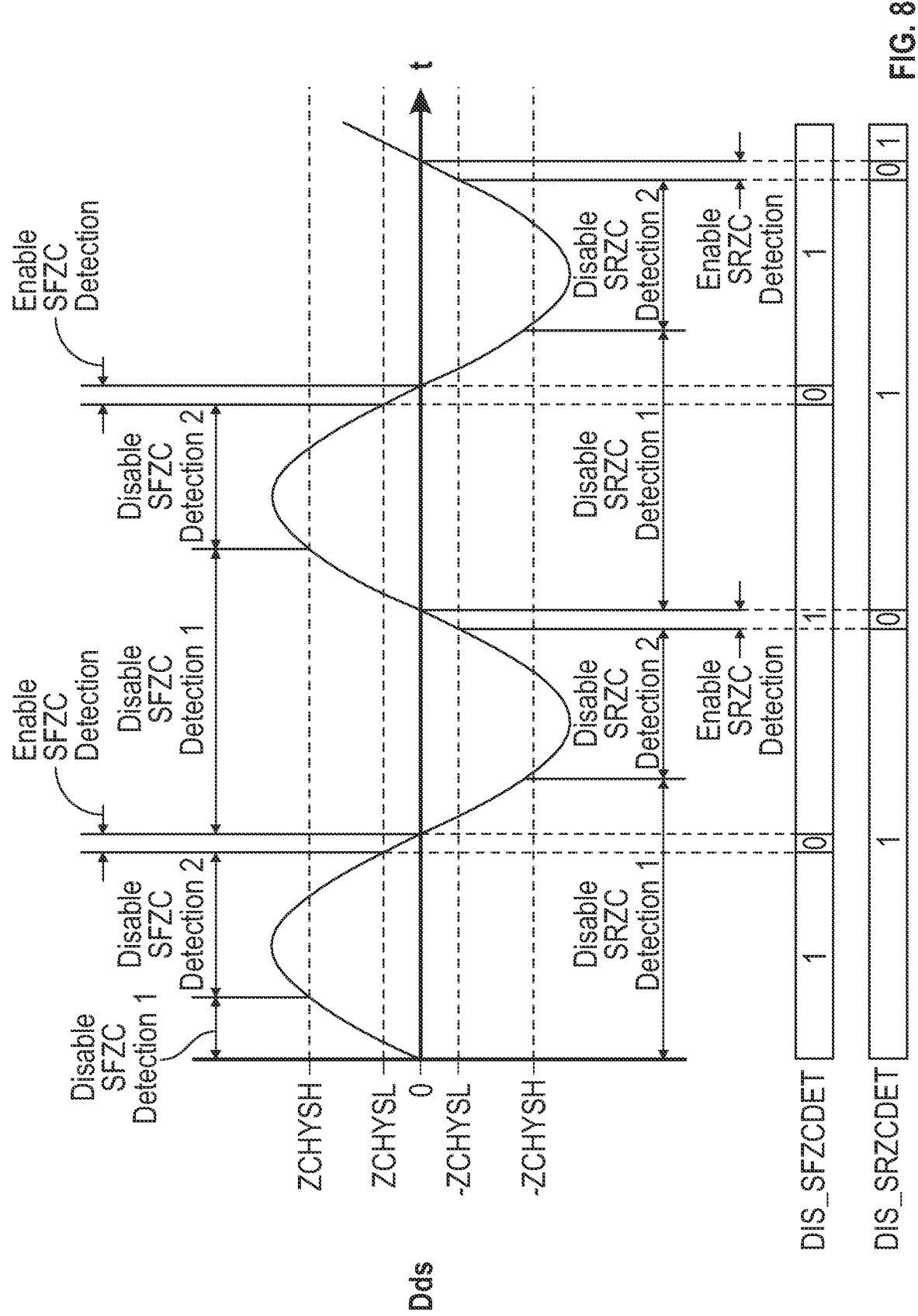
FIG. 8 is a timing chart for the derivative of a sine signal used in an implementation of a sensor offset correction system.
Figure 9:
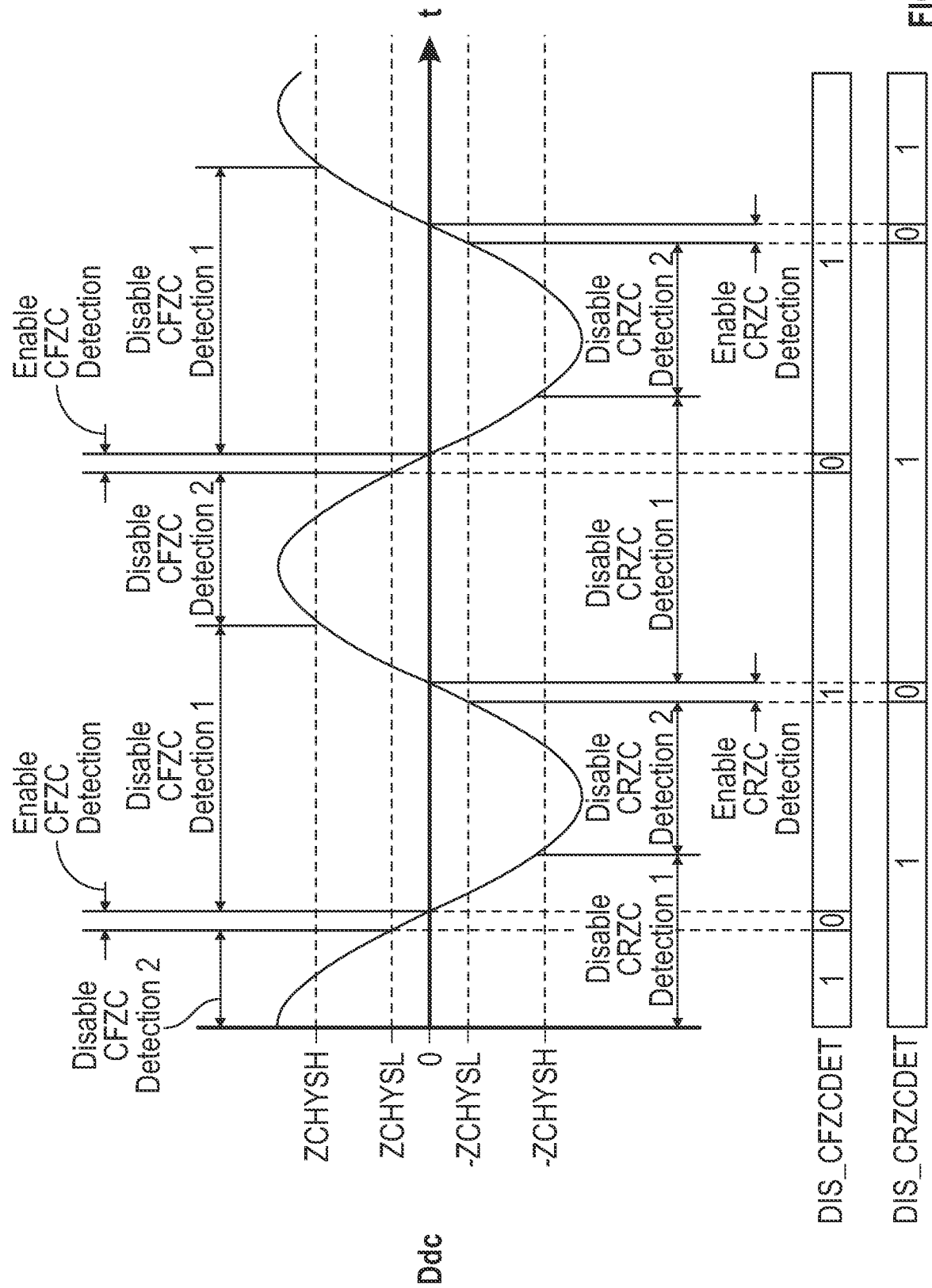
FIG. 9 is a timing chart for the derivative of a cosine signal used in an implementation of a sensor offset correction system.

FIG. 8 illustrates how the timing diagram of FIG. 7 is implemented on the derivative of the sine signal showing the location of the high and low zero cross hysteresis threshold values on the each side of the origin. FIG. 9 illustrates how the timing diagram of FIG. 7 is implemented on the derivative of the cosine signal showing the location of the high and low zero cross hysteresis threshold values on the each side of the origin.

In the system and method implementations, the first, second, third, and fourth multiplexers 60, 62, 64, 66 are then used to set the states of respective first sine rising latch 68, second sine falling latch 70, third cosine rising latch 72, and fourth cosine falling latch 74 using the Dsadfil and Dcadfil signals. The consecutive outputs of the first sine rising latch 68 and the second sine falling latch 70 are then read out into and summed by the first averaging module 76 while the consecutive outputs of the third cosine rising latch 72 and fourth cosine falling latch 74 are read out into and summed by the second averaging module 78. The first averaging module 76 then outputs a digital cosine offset signal Dcoff and the second averaging module 78 then outputs a digital sine offset signal Dsoff. The Dcoff and Dsoff signals are then provided, referring to FIG. 4, to the V cos Offset DAC 34 and to the V sin Offset DAC 32, respectively for conversion to analog signals Voffc and Voffs which are then supplied to the V cos Amplifier 26 and to the V sin Amplifier 24 for use in canceling the DC offset in the Vs and V cos signals as will be discussed hereafter. The various averaging modules may be implemented using various logic components as by using an adder, registers and divider. In particular implementations, the divider could be replaced with a barrel shifter if its denominator is limited to an Nth power of 2 where N is an integer.

Figure 14:
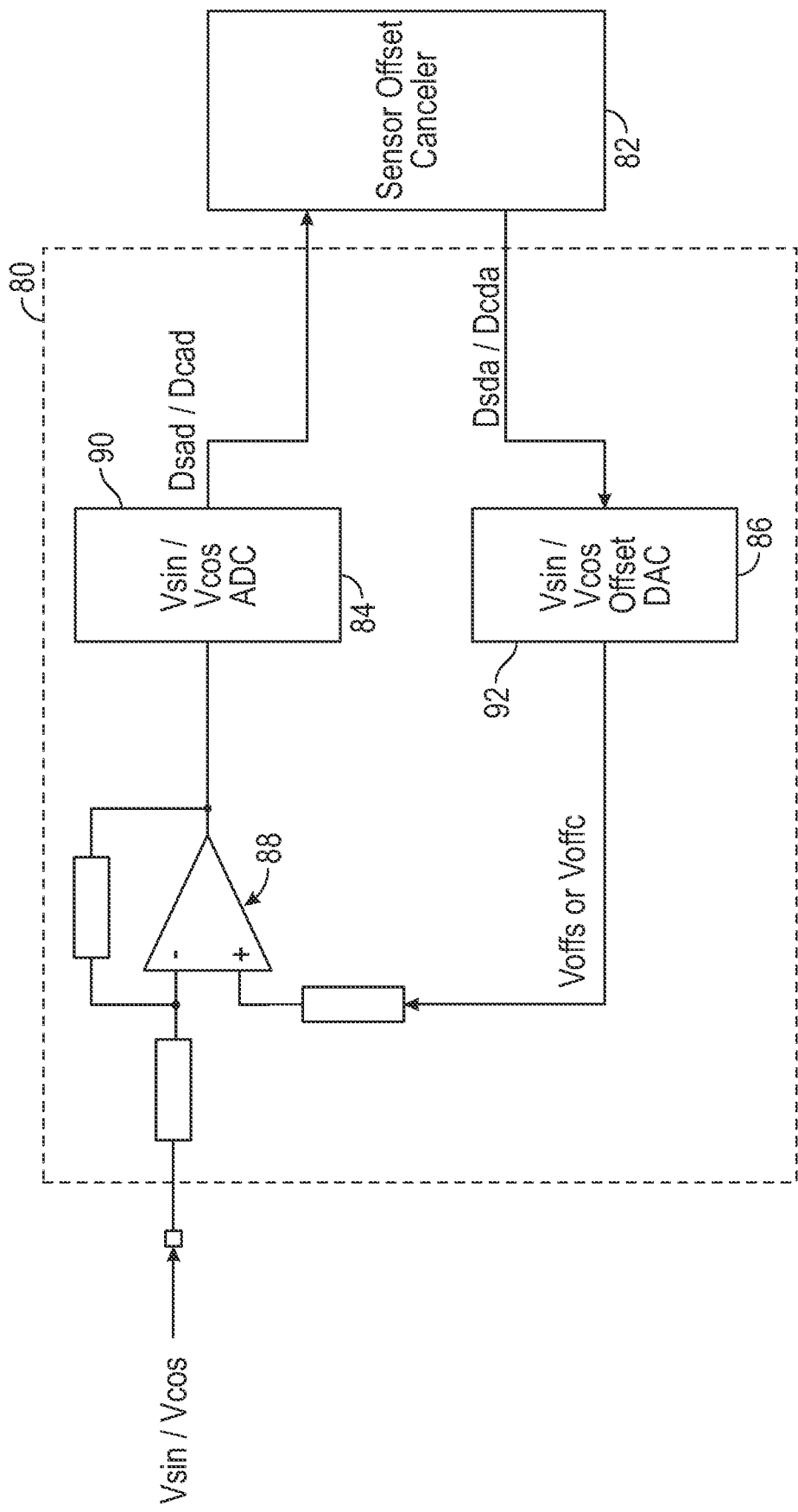
FIG. 14 is a block diagram of an amplifier portion of a resolver sensor offset correction system.

Referring to FIG. 14, an implementation of a signal amplifier portion 80 is illustrated coupled with a sensor offset canceler 82, which may be any sensor offset canceler implementation disclosed in this document. In this implementation, for the purposes of simple illustration, the structure of just one amplifier is illustrated which may be used to process either the V sin or V cos signal. However, as illustrated in FIG. 4, a second corresponding amplifier structure with the corresponding signals and analog to digital and digital to analog converters is also included to process the other remaining V sin or V cos signal in various system implementations. Similarly to the system implementation illustrated in FIG. 4, the sensor offset canceler 82 receives, in the case where the V sin signal is being processed, the Dsad signal from the V sin ADC 84 and supplies a corresponding Dsda signal to the V sin Offset DAC 86 which produces the corresponding Voffs signal to the amplifier 88. In the implementation illustrated, the amplifier is a negative feedback design and works to cancel the voltage value associated with the Voffs analog voltage signal from the V sin signal being amplified. This adjusted analog sine signal is then processed by the V sin ADC 84 to produce the Dsad signal which is then fed to the sensor offset canceler 82. In this way, the system provides a continuous feedback loop that adjusts the signals incoming to the sensor offset canceller 82 using the signals outgoing from the sensor offset canceler 82. Correspondingly, for the V cos signal, the sensor offset canceler 82 receives the Dcad signal from the V cos ADC 90 and supplies the Dcda signal to the V cos DAC 92 which then produces the corresponding analog Voffc signal which is received by the second negative feedback amplifier. The second amplifier then produces an adjusted digital cosine signal which is received by V cos ADC 90 forming the same continuous feedback loop for the V cos signal. This ability for the two or more amplifiers in the signal amplifier portion 80 to process both the V sin and V cos signals simultaneously in a continuous feedback manner using the sensor offset canceler 82 enables the system to separately cancel the DC offset in each signal simultaneously, thus improving the ability of the system to synchronize the V sin and V cos signals coming from the resolver sensor.

In various implementations, the Voffs and Voffc voltage values are the same as half of the voltage of the analog to digital converter's full scale voltage when there is no offset voltage present in either the V sin or V cos signal. Because of this property of the voltage values, the values of each of the Voffs and Voffc may be calculated in particular implementations as follows:

$$Voffs = Voff0 - Gda \times Dsda = Voff0 - Gda \times Goff \times Dsoff$$

$$Voffc = Voff0 - Gda \times Dcda = Voff0 - Gda \times Goff \times Dsoff$$

where:
Voff0=Voffc or Voffs voltage when there is no offset and $$Voff0 = \frac{AVDD}{2}$$

Figure 10:
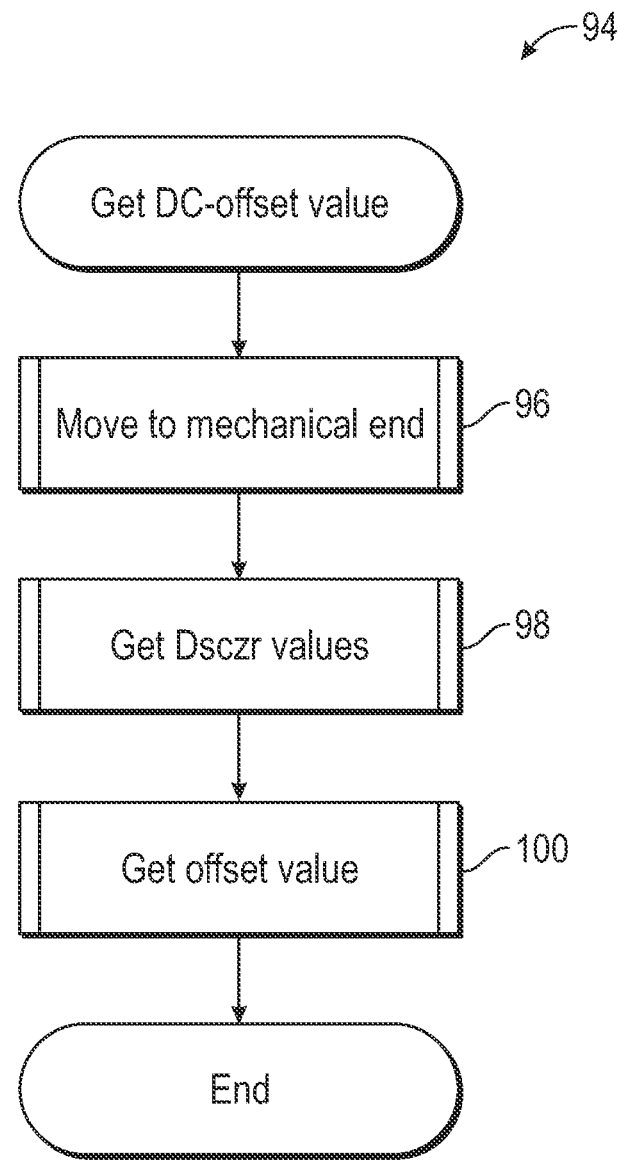
FIG. 10 is a flowchart of an implementation of a method of obtaining a direct current offset correction value for a system implementation like that illustrated in FIG. 4.
Figure 11:
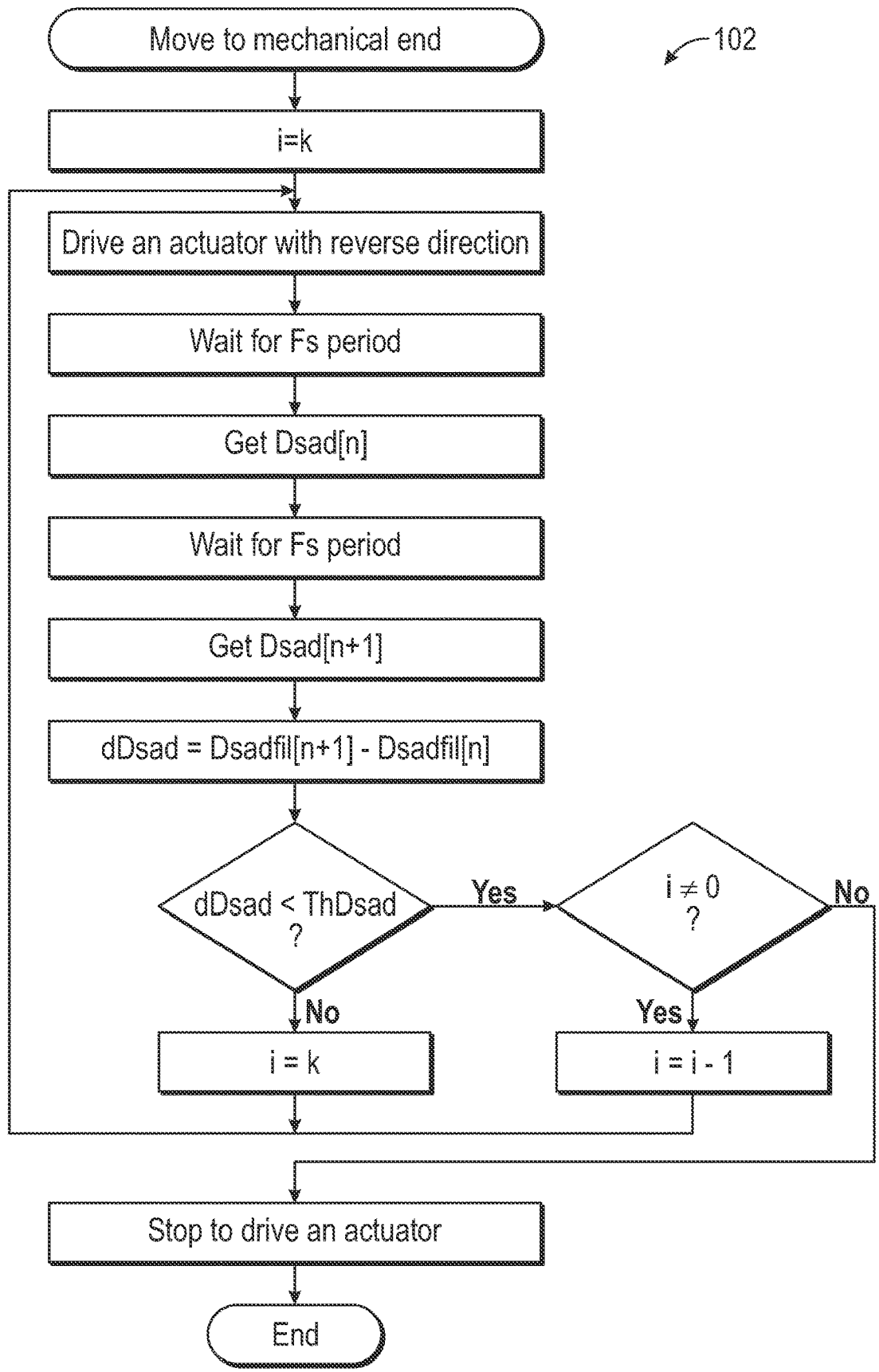
FIG. 11 is a flowchart of an implementation of a method of moving to a mechanical end for a system implementation like that illustrated in FIG. 4.
Figure 12A:
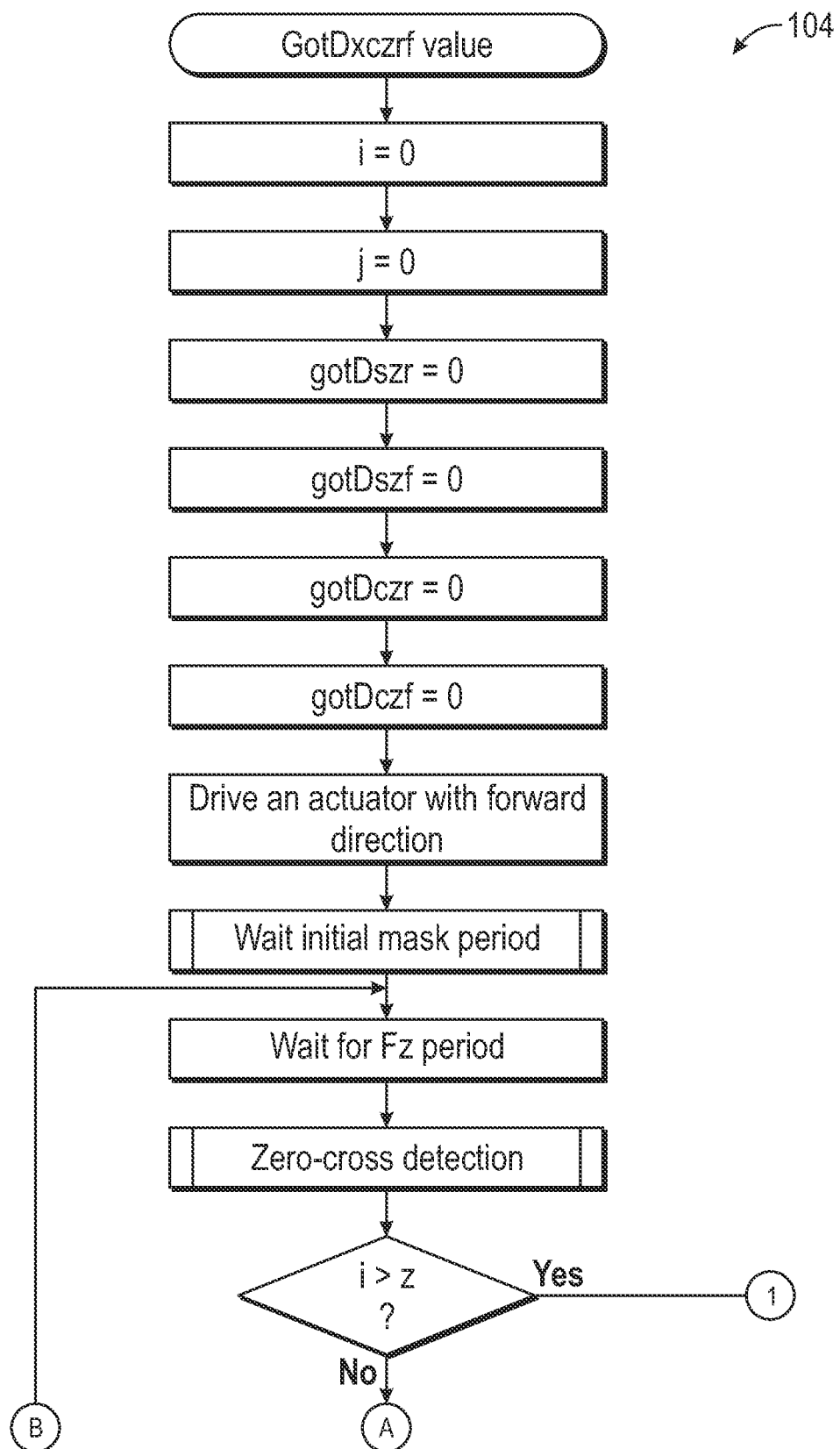
FIGS. 12A, 12B, and 13 for a flowchart of an implementation of a method of obtaining various direct current offset values for use by a direct current sensor offset canceler implementation like that illustrated in FIG. 6.
Figure 12B:
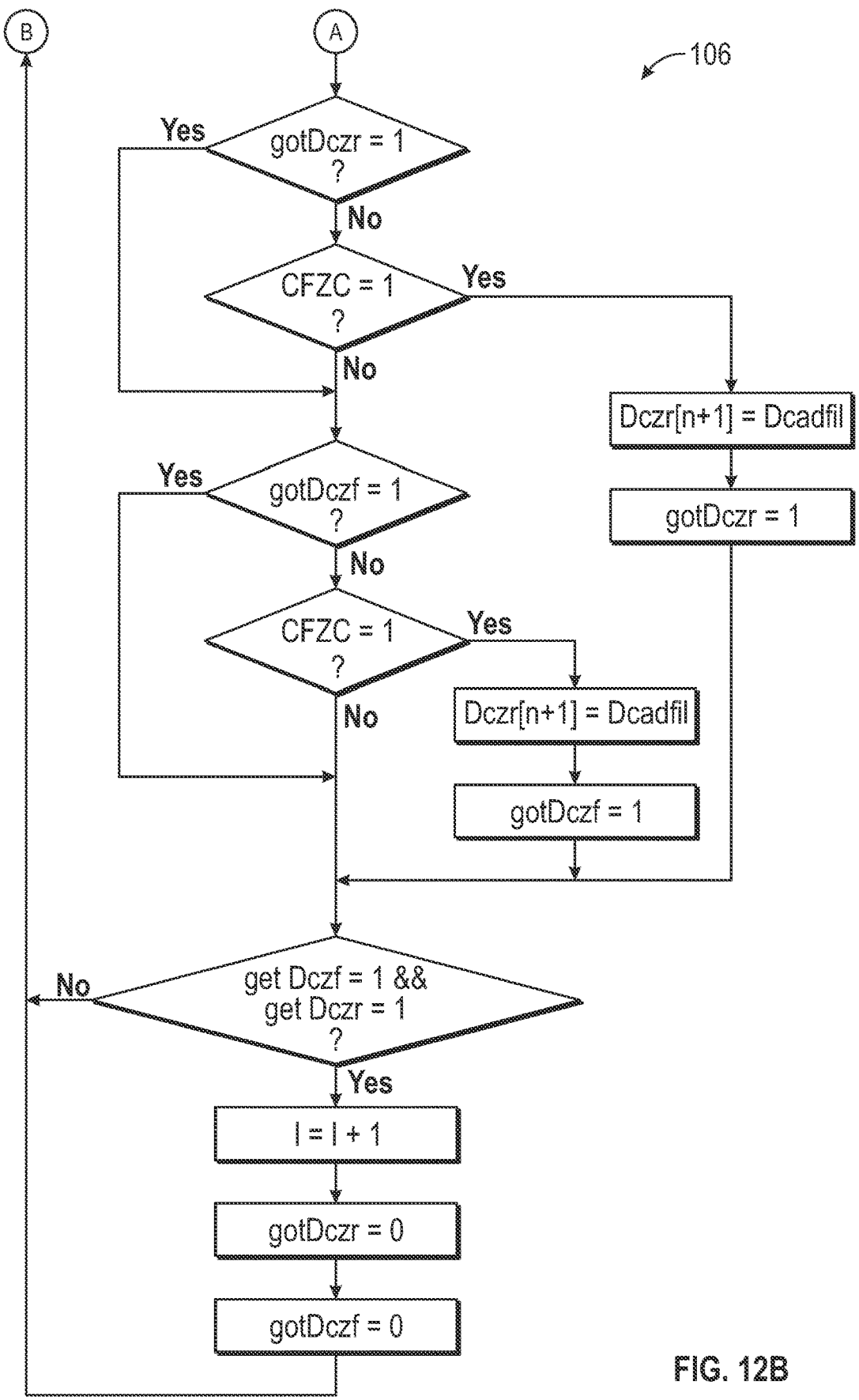
Figure 13:
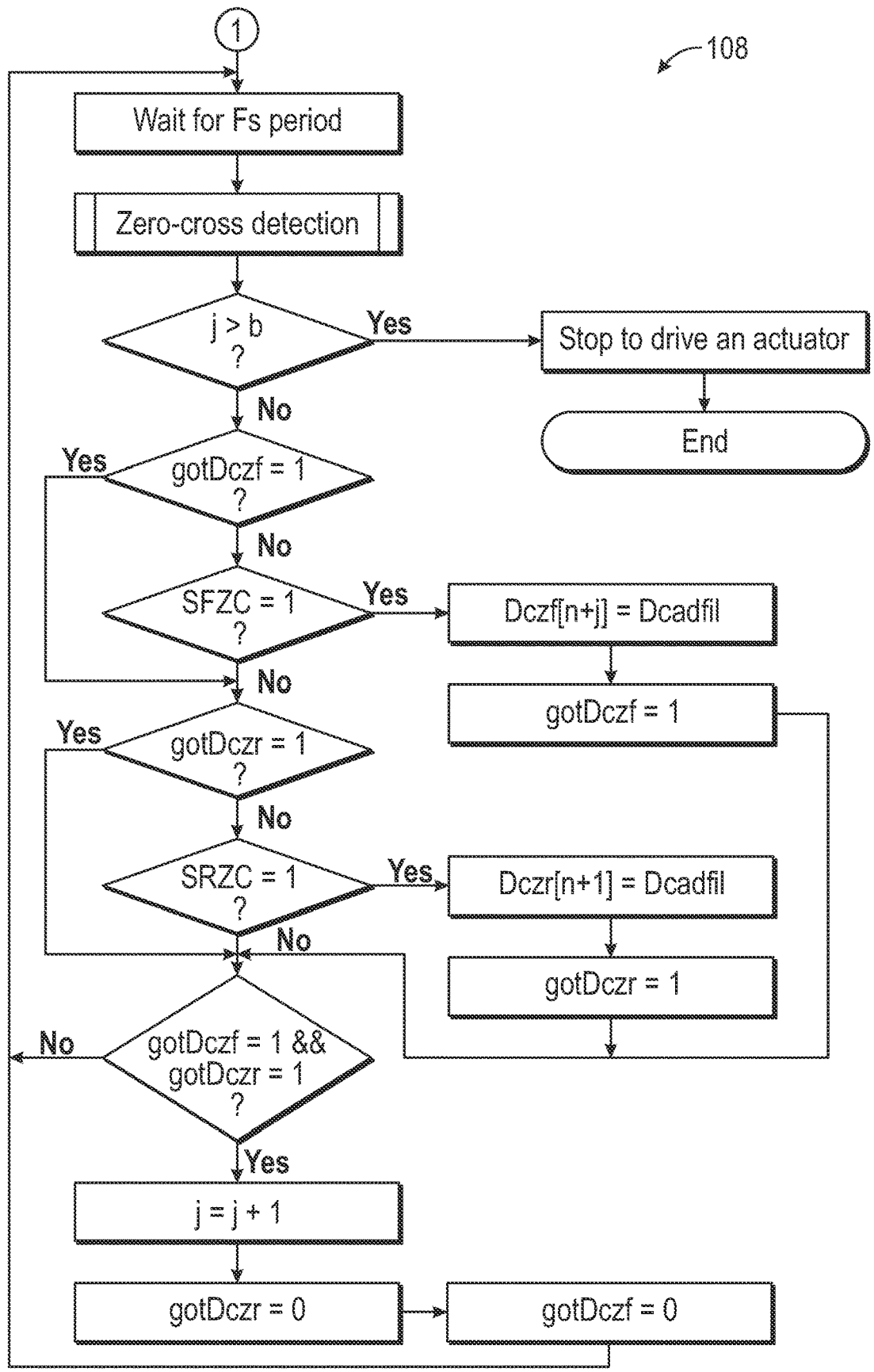

Gda=Transfer gain of either of the V sin/V cos Offset DAC
Goff=Transfer gain from either Dsoff/Dcoff to the corresponding Dsda/Dcda
AVDD=Power supply voltage for the amplifiers and for ADC which represents the full scale voltage for the ADC The various offset cancel/canceling system implementations disclosed herein may be utilized in various implementations of methods of cancelling direct current offset values from signals from a resolver type sensor. Referring to FIG. 10, a first flowchart of an implementation of DC offset cancellation method 94 is illustrated. In this implementation, the process of obtaining the DC offset value begins by having an actuator move the movable element of the system being measured by the resolver sensor to a mechanical end 96. The method also includes getting/calculating the various Dsczr[n] values 98 which may be implemented using any sensor offset canceler implementations disclosed herein. The method also includes getting/calculating the various Voffs and Voffc values and using them to cancel the DC offset in the incoming V sin and V cos signals from the resolver sensor 100. In this document, FIG. 11 illustrates a flow chart of an implementation of a method of moving the system to the mechanical end 102 and FIGS. 12A-B and FIG. 13 illustrate flow charts of an implementation of methods of getting the Dsczr[n] values and getting the Voffs and Voffc values 104, 106, 108. Referring to FIG. 11, the method begins with using the actuator control driver to drive an actuator in a reverse direction and then sequentially continue to drive the actuator until the mechanical end position of the moveable element is detected using the resolver sensor. In the method implementation illustrated in FIG. 11, the Dsad values are differential values of Dsadfil. When the differential Dsad values are less than a predetermined threshold Dsad value (ThDsad) throughout k sampling times, the system determines that the movable element has reached its mechanical end position. While in FIG. 11 the use of sine signal values is illustrated, in other method implementations, the use of cosine signal values could be used alternatively, replacing Dsad with Dcad and using a predetermined threshold Dcad value (ThDcad) to find the mechanical end.

Referring to FIGS. 12A-B, flowcharts of a method 104, 106 of obtaining values for Dszr, Dszf, Dczr and Dczf are illustrated. In the method charts, the process of waiting for an initial mask period refers to waiting a predetermined period of time following driving the moveable element in a forward direction opposite the direction driven to find the mechanical end prior to sampling. The use of this initial mask time period may operate to ensure that the signal(s) being utilized have time to stabilize prior to sampling during the sampling period. This may prevent moving in the wrong direction or other incorrect calculations based on the unstable signal(s). The indicator 1 in FIG. 12A leads to the flowchart implementation 108 illustrated in FIG. 13 which outlines additional portions of the method for obtaining the various values.

Following the calculation of the Voffs and Voffc values using the various method implementations disclosed herein, the various method implementations disclosed herein use these values and the signal amplifier portions of the system to cancel the DC offset in the V sin and V cos signals from the resolver sensor. In various method implementations, the procedures outlined with respect to the signal amplifier system illustrated in FIG. 14 may be utilized.

Figure 15:
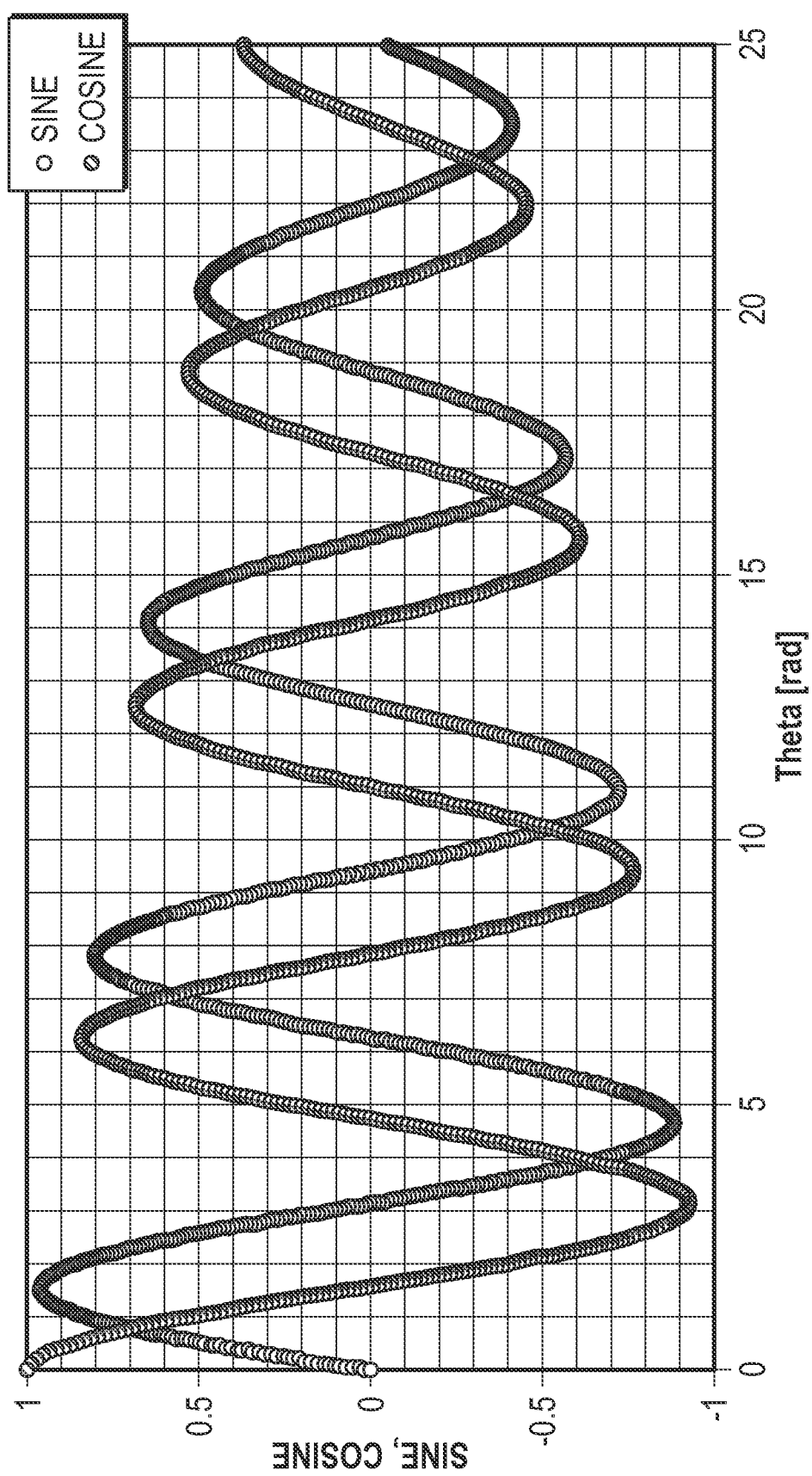
FIG. 15 is a graph of simulated samples of a sine wave and samples of a cosine wave exhibiting amplitude attenuation over time from a resolver sensor.

A simulation was conducted to compare the performance of an implementation of a method of cancelling DC offset in a resolver sensor's sine and cosine signals like that disclosed herein with the performance of the method illustrated in FIG. 2 of this document. The signals used in the simulation were chosen to have amplitude variation and were represented by the formulas $V \sin = (1 - 0.025 \times) \sin(x)$ and $V \cos = (1 - 0.025 \times) \cos(x)$. A graph of the signals versus theta in radians is illustrated in FIG. 15 which clearly shows the dampening of the amplitude. FIG. 16 contains the results of the simulation of each method for the sine signal in the two bars on the right and for the cosine signal in the two bars on the left. As illustrated, the method disclosed herein is 57 times better in reducing error in the sine signal than the maximum/minimum method of FIG. 2. For the cosine signal, the differential method disclosed herein was 5 times better in reducing error than the maximum/minimum method of FIG. 2. These results were unexpectedly good given the challenging nature of correcting for the constantly varying error being induced by an amplitude varying sine and cosine signal like those used in the simulation.

In places where the description above refers to particular implementations of offset cancel systems and related methods and implementing components, sub-components, methods and sub-methods, it should be readily apparent that a number of modifications may be made without departing from the spirit thereof and that these implementations, implementing components, sub-components, methods and sub-methods may be applied to other offset cancel systems and related methods.

What is claimed is:

1. A resolver sensor system comprising:
   a signal amplifier portion configured to be coupled to a magnetoresistive sensor, the magnetoresistive sensor configured to be coupled with a movable element, the signal amplifier portion configured to receive a sine signal and a cosine signal from the magnetoresistive sensor; and
   a sensor offset canceling portion coupled with the signal amplifier portion and configured to be coupled with a system controller;
   wherein the signal amplifier portion is configured to couple with a servo signal processor coupled with an actuator driver;
   wherein the sensor offset canceling portion is configured to generate a direct current offset correction signal to the signal amplifier portion;
   wherein the signal amplifier portion is configured to use two or more amplifiers comprised in the signal amplifier portion to receive the sine signal and the cosine signal and to generate a corresponding adjusted digital sine signal and a corresponding adjusted digital cosine signal; and
   wherein the signal amplifier portion is configured to provide the adjusted digital sine signal and the adjusted digital cosine signal to one of the servo signal processor or the system controller for use in determining a position of the movable element.

2. The system of claim 1, wherein the adjusted digital sine signal and the adjusted digital cosine signal were adjusted to remove a direct current offset present in the sine signal and a direct current offset present in the cosine signal, respectively.

3. The system of claim 2, wherein the signal amplifier portion and the sensor offset canceling portion are configured to remove a direct current offset present in the sine signal and a direct current offset present in the cosine signal that includes one of asymmetry, amplitude fluctuation, or both asymmetry and amplitude fluctuation.

4. The system of claim 1, wherein the signal amplifier portion further comprises a digital to analog converter coupled to a first one of the two or more amplifiers and an analog to digital converter coupled to a second one of the two or more amplifiers.

5. The system of claim 1, wherein the sensor offset canceling portion further comprises:
   a first noise reduction filter coupled to a first zero cross detector coupled with a first two AND gates, a first two multiplexers, a first two latches, and a first averaging module; and
   a second noise reduction filter coupled to a second zero cross detector coupled with a second two AND gates, a second two multiplexers, a second two latches, and a second averaging module.

6. The system of claim 5, wherein the first averaging module is configured to calculate a direct current offset for the sine signal and the second averaging module is configured to calculate a direct current offset for the cosine signal.

7. A sensor offset canceler for a resolver sensor system, the sensor offset canceler comprising:

a first noise reduction filter configured to receive a digital sine signal from a signal amplifier portion and generate a filtered digital sine signal;

a first zero cross detector configured to receive the filtered digital sine signal and output a rising zero cross point signal and a falling zero cross point signal;

a first two AND gates coupled with the first zero cross detector;

a first multiplexer and a first latch coupled with a first one of the first two AND gates;

a second multiplexer and a second latch coupled with a second one of the first two AND gates;

a first averaging module coupled with the first latch and with the second latch, the first averaging module configured to output a direct current offset correction for a cosine signal;

a second noise reduction filter configured to receive a digital cosine signal from a signal amplifier portion and generate a filtered digital cosine signal;

a second zero cross detector configured to receive the filtered digital cosine signal and output a rising zero cross point signal and a falling zero cross point signal;

a second two AND gates coupled with the second zero cross detector;

a third multiplexer and a third latch coupled with a first one of the second two AND gates;

a fourth multiplexer and a fourth latch coupled with a second one of the second two AND gates; and a second averaging module coupled with the third latch and with the fourth latch, the second averaging module configured to output a direct current offset correction for a sine signal.

8. The canceler of claim 7, wherein the first one of the first two AND gates is configured to receive a sine rising zero cross detection flag.

9. The canceler of claim 7, wherein the second one of the first two AND gates is configured to receive a sine falling zero cross detection flag.

10. The canceler of claim 7, wherein the first one of the second two AND gates is configured to receive a cosine rising zero cross detector flag.

11. The canceler of claim 7, wherein the second one of the second two AND gates is configured to receive a cosine falling zero cross detector flag.

12. The canceler of claim 7, wherein the first zero cross detector is configured to take a derivative of the filtered digital sine signal.

13. The canceler of claim 7, wherein the second zero cross detector is configured to take a derivative of the filtered digital cosine signal.

14. A method of correcting direct current offset error for a resolver sensor system, the method comprising:

receiving a sine signal and a cosine signal from a resolver sensor at a signal amplifier portion;

amplifying the sine signal using a first one or more amplifiers;

amplifying the cosine signal using a second one or more amplifiers;

converting the sine signal to a digital sine signal using a first analog to digital converter;

converting the cosine signal to a digital cosine signal using a second analog to digital converter;

using a sensor offset canceling portion:
 taking a derivative of the sine signal;
 using a first zero cross detector, generating a sine rising zero cross signal and a sine falling zero cross signal using the derivative of the sine signal;
 with a sine rising zero cross detection flag and a first AND gate, setting a state of a first sine rising latch;
 with a sine falling zero cross detection flag and a second AND gate, setting a state of a second sine falling latch;
 taking a derivative of the cosine signal;
 using a second zero cross detector, generating a cosine rising zero cross signal and a cosine falling zero cross signal using the derivative of the cosine signal;
 with a cosine rising zero cross detection flag and a third AND gate, setting a state of a third cosine rising latch;
 with a cosine falling zero cross detection flag and a fourth AND gate, setting a state of a fourth cosine falling latch;
 averaging outputs of the first sine rising latch and the second sine falling latch using a first averaging module and outputting an analog direct current cosine offset signal; and
 averaging outputs of the third cosine rising latch and the fourth cosine falling latch using a second averaging module and outputting an analog direct current sine offset signal.

15. The method of claim 14, further comprising:

generating a digital direct current cosine offset correction signal using a second digital to analog converter;

providing the digital direct current cosine offset correction signal to the second one or more amplifiers of the signal amplifier portion;

generating a digital direct current sine offset correction signal using a first digital to analog converter; and providing the digital direct current sine offset correction signal to the first one or more amplifiers of the signal amplifier portion.

16. The method of claim 15, further comprising:

using the digital direct current offset correction cosine signal as an input to the first one or more amplifiers, adjusting an output of the one or more amplifiers; and using the digital direct current sine offset correction signal as an input to the second one or more amplifiers, adjusting and output of the second one or more implementations.

17. A method of calculating a direct current offset correction value using the resolver sensor system of claim 1, the method comprising:

using the actuator driver, sending a signal to an actuator coupled with the movable element configured to drive the movable element to a mechanical end position;

using the signal amplifier portion in the sensor offset canceling portion, performing zero cross detection; and using the sensor offset canceling portion, calculating a direct current offset correction for the sine signal and a direct current offset correction for the cosine signal.

18. The method of claim 17, further comprising:

using the signal amplifier portion, canceling a direct current offset present in the sine signal using the direct current offset correction for the sine signal; and using the signal amplifier portion, canceling a direct current offset present in the cosine signal using the direct current offset correction for the cosine signal.

19. The method of claim 17, wherein driving the movable element to the mechanical end position further comprises comparing a derivative of one of a filtered sine signal or a filtered cosine signal with a predetermined threshold value.

20. The method of claim 17, wherein performing zero cross detection further comprises waiting an initial mask time period prior to initiating a sampling period.

\* \* \* \* \*